UNITED STATES PATENT OFFICE.

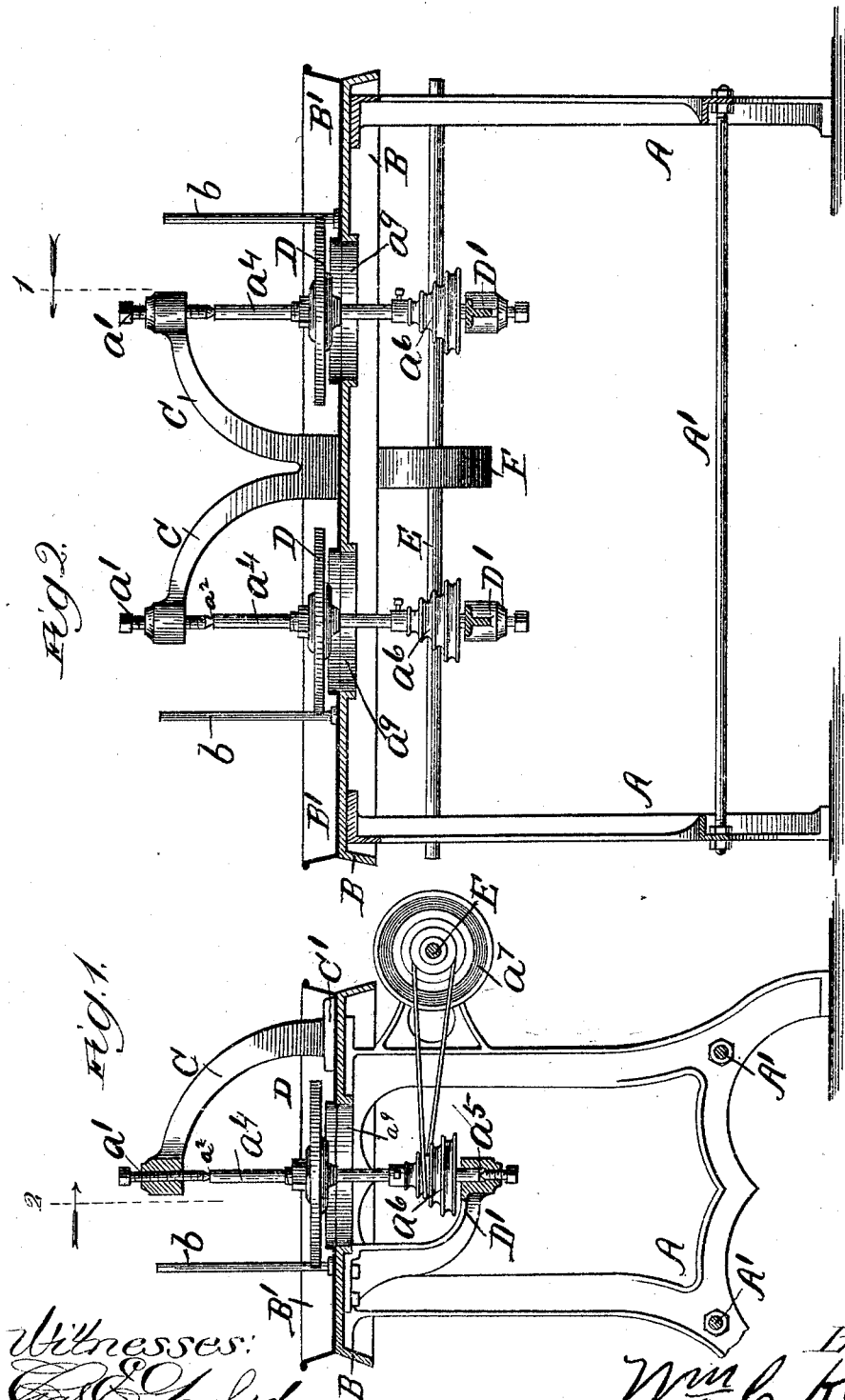

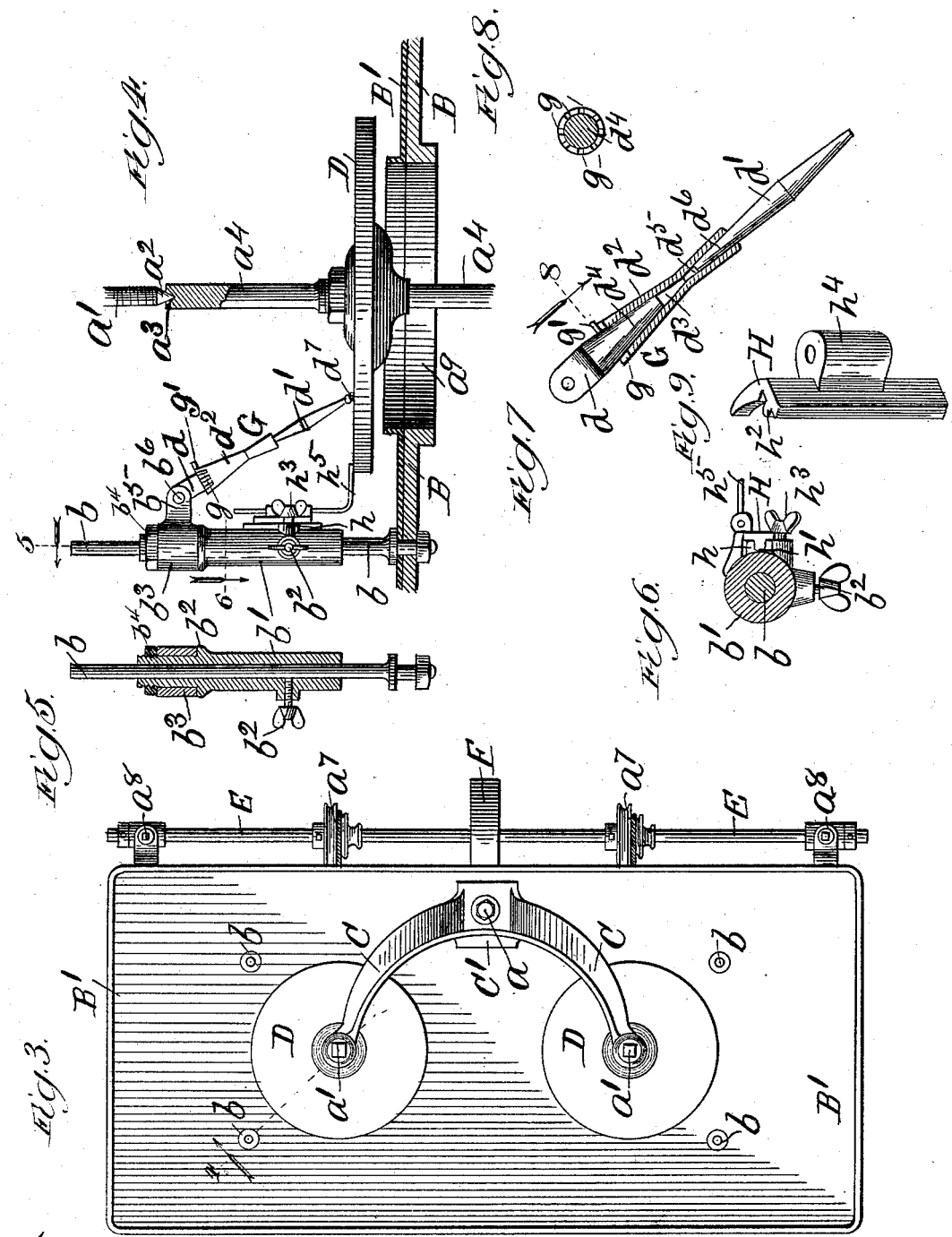

WILLIAM C. KNUTH, OF CHICAGO, ILLINOIS.

MACHINE FOR CUTTING AND POLISHING GEMS.

SPECIFICATION forming part of Letters Patent No. 509,814, dated November 28, 1893.

Application filed June 23, 1893. Serial No. 478,641. (No model.)

*To all whom it may concern:*

Be it known that I, WILLIAM C. KNUTH, a citizen of the United States, residing at Chicago, in the county of Cook and State of Illinois, have invented certain new and useful Improvements in Machines for Cutting and Polishing Gems; and I do hereby declare the following to be a full, clear, and exact description of the invention, such as will enable others skilled in the art to which it appertains to make and use the same.

Reference is had to the accompanying drawings, forming a part of this specification.

This invention relates to improvements in machines for cutting and polishing gems, and has for its object to provide such machines with an arrangement having a positive mechanical adjustment whereby the facets of a gem or stone are cut or ground to uniform dimensions.

In the drawings—Figure 1 is a broken-away transverse section on line 1, Fig. 2, looking in the direction indicated by the arrow; Fig. 2, a vertical longitudinal section on line 2, Fig. 1; Fig. 3, a plan; Fig. 4, a broken-away diagonal section and part elevation, on line 4, Fig. 3; Fig. 5, a vertical section on line 5, Fig. 4; Fig. 6, a horizontal section on line 6, Fig. 4; Fig. 7, part elevation and part section of a holding arm; Fig. 8, a transverse section on line 8, Fig. 7; and Fig. 9, a detached detail.

The supporting-frame consists of the ends A A connected by a number of tie-rods A'.

B is a table-bed and B' a water-pan mounted thereon.

The two bracket-arms C C rise and diverge from a common base-part C', which is rigidly bolted to the table B, as at $a$, Fig. 3. The upper ends of these arms have the screw-threaded bearing-bolts $a'$ $a'$ inserted downwardly therethrough. The lower ends of these bolts are dressed down to the conical bearing-point $a^2$ which engages loosely with the corresponding recess $a^3$ formed in the upper ends of vertical spindles $a^4$ $a^4$, on which are mounted the cutting or grinding-wheels D. The lower ends of these spindles are provided with the step-bearings $a^5$ in the supporting bracket-arms D' D' bolted to the under side of the table and extending downwardly therefrom, shown in Figs. 1 and 2. The speed-pulleys $a^6$ are mounted on the lower ends of these spindles and belt with corresponding pulleys $a^7$ mounted on countershaft E, provided with suitable journal-bearings $a^8$ in the respective ends of the frame.

The pulley F, on shaft E, belts with the motive power. By this arrangement the required motion is transmitted to the spindles on which the cutting or polishing-wheels are mounted.

The table and water-pan are provided with openings $a^9$ in line with the spindles so that the same, and the parts mounted thereon may be removed and exchanged.

The lower ends of a number of posts $b$ are rigidly secured to the table and extend upwardly therefrom. These posts are disposed as shown in Fig. 3, giving room to a corresponding number of workmen. The posts $b$ have a sleeve $b'$ adjustably mounted thereon by hand-screw $b^2$ (Figs. 4, 5 and 6) so that the same may be raised or lowered to bring the arm holding the gem to the desired angle with reference to the cutting-wheel.

The sleeve $b'$ is provided with a shoulder $b^2$ on which rests a collar $b^3$, held in place by a nut $b^4$, threaded on the upper end of the sleeve. The collar $b^3$ is provided with a lug $b^5$ to which is pivoted the upper end, as at $b^6$, of a gem or work-holding arm G. This arm consists of the upper shoulder-part $d$, the lower stem-part $d'$, and the central connecting tubular socket-part $d^2$. The upper end of this connecting part is provided with the contracting conical recess $d^3$ (Fig. 7) to receive the corresponding conical or tapering end $d^4$ of the part $d$. The lower end is provided with a similar recess $d^5$ to receive the upper tapering end $d^6$ of the part $d'$; to the lower end of which is secured the object to be ground, as shown at $d^7$, Fig. 4. These parts are simply held together by frictional contact, and three parts are used instead of one or two in order to facilitate the proper adjustment. The upper end of the socket part is provided in its circumference with a number of apertures $g$ disposed at regular intervals Figs. 4, 7 and 8. A pin $g'$ is loosely set in the engaging shoulder-part $d$. Now, when one facet or face is cut, the socket part of the arm may be turned to bring the next aperture into position for engagement with the pin $g'$; thus bringing a new surface of the object being cut into position, and so on until the work is completed. By this arrangement a positive mechanical adjustment is secured and every facet is uniformly alike.

The sleeve $b'$ is provided on one side with a projection $h$, (Figs. 4 and 6) having a vertical groove $h'$. A gage-slide H (Fig. 9) is provided with a rib $h^2$ which fits loosely into said groove, by which means said slide is adapted to have a vertical adjustment and is locked in place by hand-screw $h^3$. The gage-slide is provided with a perforated lug $h^4$ in which is fixed (Fig. 4) the angle gage-rod $h^5$; the lower end extending over onto the grinding-wheel. This feature provides for a uniform adjustment of the grinding-wheel and sleeve carrying the holding-arm, when a grinding or cutting-wheel is exchanged, or the sleeve is transferred to another machine having a polishing-wheel, so that the arm holding the object is always inclined at the same angle.

Having thus described my invention, what I claim as new, and desire to secure by Letters Patent, is—

1. In a machine of the kind described, a work-holding arm, consisting of a shoulder-part, the lower stem-part, and a tubular connecting part, having conical recesses corresponding to the tapering ends of the shoulder and stem-parts, substantially as set forth.

2. In a machine of the kind described, a work-holding arm, comprising a shoulder-part, a stem-part, a socket-part, loosely connecting the shoulder and stem-part, said socket-part being provided in its upper end with a number of apertures, and a pin, loosely seated in the shoulder-part, substantially as set forth.

In testimony whereof I affix my signature in presence of two witnesses.

WILLIAM C. KNUTH.

Witnesses:
L. M. FREEMAN,
J. B. DONALSON.